(12) United States Patent
Bernadet et al.

(10) Patent No.: US 8,905,352 B2
(45) Date of Patent: Dec. 9, 2014

(54) AIRCRAFT NOSE STRUCTURE WITH LANDING GEAR COMPARTMENT

(71) Applicant: Airbus Operations S.A.S., Toulouse Cedex 9 (FR)

(72) Inventors: Philippe Bernadet, Colomiers (FR); Patrick Lieven, Fronton (FR); Marc Dugerie, Encausse (FR); Christophe Mialhe, Giroussens (FR); Romain Delahaye, Colomiers (FR)

(73) Assignee: Airbus Operations S.A.S. (FR)

( * ) Notice: Subject to any disclaimer, the term of this patent is extended or adjusted under 35 U.S.C. 154(b) by 47 days.

(21) Appl. No.: 13/710,577

(22) Filed: Dec. 11, 2012

(65) Prior Publication Data

US 2013/0146710 A1 Jun. 13, 2013

(30) Foreign Application Priority Data

Dec. 12, 2011 (FR) ...................................... 11 61462

(51) Int. Cl.
| | | |
|---|---|---|
| *B64C 1/00* | (2006.01) | |
| *B64C 1/36* | (2006.01) | |
| *B64C 1/10* | (2006.01) | |
| *B64D 45/00* | (2006.01) | |
| *B64C 25/14* | (2006.01) | |

(52) U.S. Cl.
CPC . *B64D 45/00* (2013.01); *B64C 1/36* (2013.01); *B64C 1/10* (2013.01); *B64C 25/14* (2013.01)
USPC ...................... 244/119; 244/102 R; 244/118.5

(58) Field of Classification Search
USPC .............................................. 244/119, 118.5
See application file for complete search history.

(56) References Cited

U.S. PATENT DOCUMENTS

| | | | | |
|---|---|---|---|---|
| 2,437,574 | A * | 3/1948 | Watter et al. ............... | 244/117 R |
| 4,479,621 | A * | 10/1984 | Bergholz ................... | 244/117 R |
| 6,213,428 | B1* | 4/2001 | Chaumel et al. ............ | 244/119 |
| 7,721,992 | B2* | 5/2010 | Keeler et al. ................ | 244/119 |
| 7,784,736 | B2* | 8/2010 | Guering et al. .............. | 244/119 |
| 8,028,955 | B2* | 10/2011 | De Ruffray et al. ...... | 244/102 R |
| 8,256,711 | B2* | 9/2012 | Guering et al. ........... | 244/102 R |
| 8,262,020 | B2* | 9/2012 | Guering et al. ........... | 244/102 R |
| 8,336,819 | B2* | 12/2012 | De Ruffray et al. ...... | 244/102 R |
| 8,366,041 | B2* | 2/2013 | Ricaud et al. ................ | 244/119 |
| 8,366,042 | B2* | 2/2013 | Haselmeier et al. .......... | 244/119 |
| 2008/0179459 | A1* | 7/2008 | Garcia Laja et al. ......... | 244/119 |

(Continued)

FOREIGN PATENT DOCUMENTS

| | | |
|---|---|---|
| EP | 0980822 A1 | 2/2000 |
| FR | 2910875 A1 | 7/2008 |

*Primary Examiner* — Christopher P Ellis
*Assistant Examiner* — Medhat Badawi
(74) *Attorney, Agent, or Firm* — Lerner, David, Littenberg, Krumholz & Mentlik, LLP

(57) ABSTRACT

An aircraft nose structure includes a fuselage and a pressure-tight bulkhead fixed at its periphery to the fuselage and transversely dividing the fuselage into a pressurized upper zone and an unpressurized lower zone for accommodating retractable nose landing gear. The pressuretight bulkhead includes a floor of the pressurized upper zone, and a substantially flat rear panel extending between a rear edge of the floor and the fuselage. The floor and the rear panel are fixed laterally to the fuselage. The fuselage includes an exterior wall and reinforcing transverse frames to which the exterior wall is fixed. In line with the pressuretight bulkhead, at least some of the transverse reinforcing frames extend along the outline of the pressurized upper zone and constitute members that reinforce the pressuretight bulkhead.

15 Claims, 2 Drawing Sheets

(56) References Cited

U.S. PATENT DOCUMENTS

| | | |
|---|---|---|
| 2008/0210813 A1* | 9/2008 | Guering et al. ............ 244/102 R |
| 2008/0210820 A1* | 9/2008 | Kismarton et al. ............ 244/120 |
| 2008/0302060 A1* | 12/2008 | Ciprian ..................... 52/787.12 |
| 2009/0159743 A1* | 6/2009 | Guering et al. ............ 244/102 R |
| 2010/0001129 A1* | 1/2010 | Guering .................... 244/102 R |
| 2010/0032521 A1* | 2/2010 | De Ruffray et al. ...... 244/102 A |
| 2010/0072319 A1* | 3/2010 | De Ruffray et al. .... 244/102 SS |
| 2010/0102169 A1* | 4/2010 | Zorzetto et al. ................ 244/119 |
| 2010/0116934 A1* | 5/2010 | Herzog et al. ............. 244/118.5 |
| 2010/0176240 A1* | 7/2010 | Guering et al. ........... 244/102 R |
| 2010/0213314 A1* | 8/2010 | Haselmeier et al. .......... 244/119 |
| 2011/0001008 A1* | 1/2011 | Delahaye et al. ............. 244/119 |
| 2012/0068014 A1* | 3/2012 | Lesemann et al. ........... 244/119 |
| 2012/0104170 A1* | 5/2012 | Gallant et al. ................ 244/132 |
| 2012/0211602 A1* | 8/2012 | Dugerie et al. ............... 244/119 |
| 2012/0267478 A1* | 10/2012 | Dazet ........................... 244/119 |
| 2013/0048785 A1* | 2/2013 | Grosse-Plankermann et al. ............................ 244/119 |
| 2013/0146709 A1* | 6/2013 | Bernadet et al. ............ 244/118.5 |

* cited by examiner

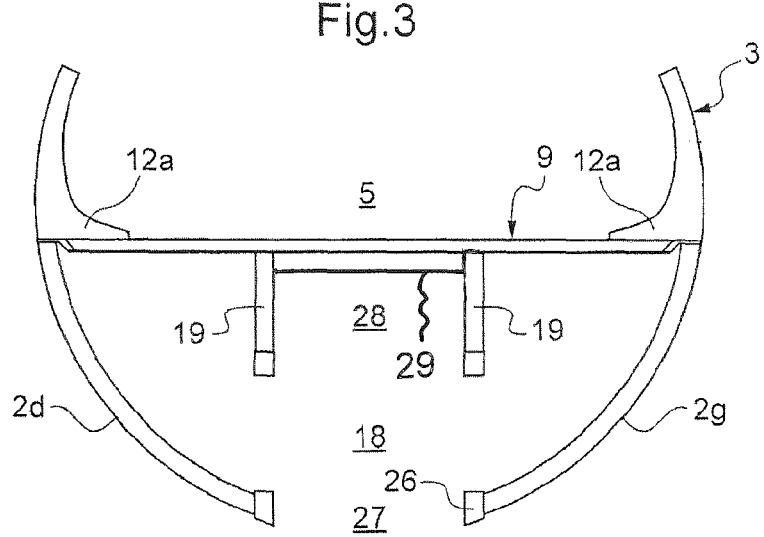
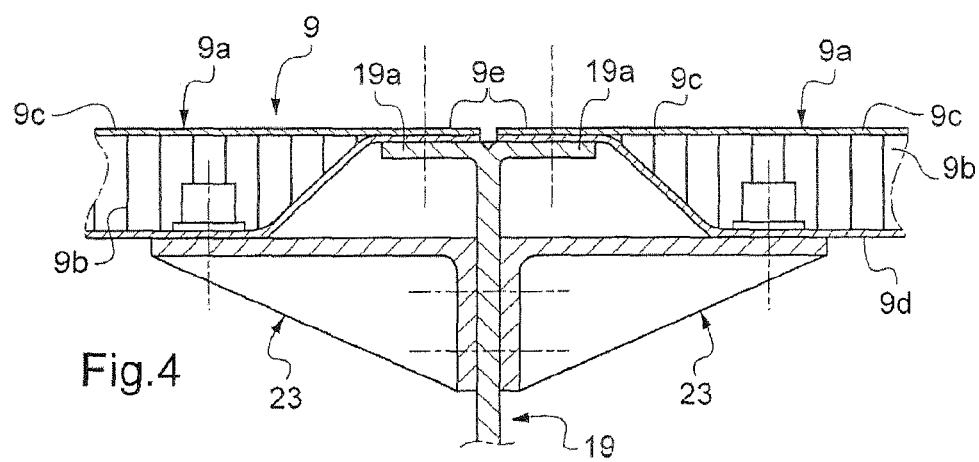
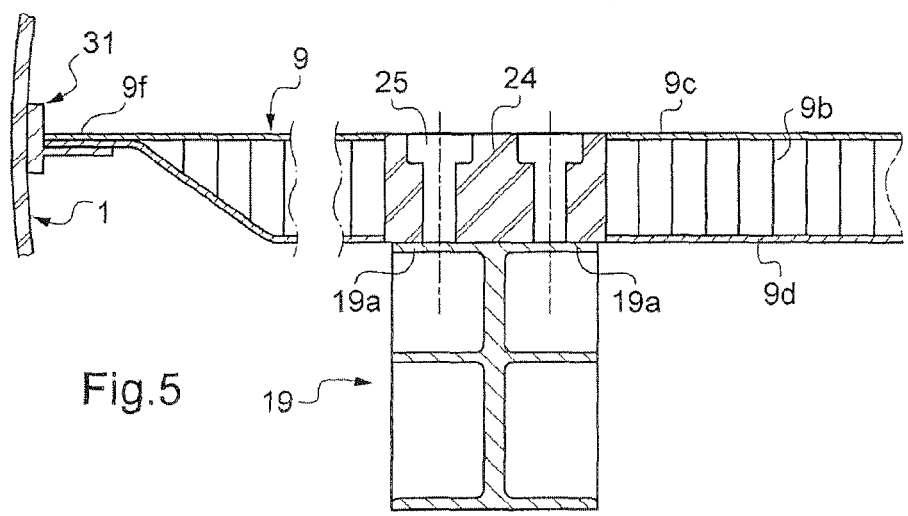

AIRCRAFT NOSE STRUCTURE WITH LANDING GEAR COMPARTMENT

FIELD OF INVENTION

The invention relates to an aircraft nose structure comprising an unpressurized zone to accommodate retractable nose landing gear, and to an aircraft provided with such a structure.

BACKGROUND OF INVENTION

In an aircraft with retractable nose landing gear, this gear is generally housed in a landing gear bay or box secured to the aircraft fuselage around an opening through which the landing gear can be lowered from the bay and retracted thereinto. Moving doors close this opening in the flight configuration and open downwards when the landing gear is lowered.

In such a conventional configuration, the nose landing gear bay is subjected internally to atmospheric pressure and thus forms an enclave within a pressurized zone of the aircraft. Its walls are reinforced by a framework in order, firstly, to withstand the loadings transmitted by the landing gear and secondly to form a pressure barrier.

Patent FR 2 910 875 discloses an aircraft nose structure of the type comprising a fuselage and a pressuretight bulkhead fixed at its periphery to the said fuselage and transversely dividing the said fuselage into a pressurized zone and an unpressurized zone in which to accommodate retractable nose landing gear. According to that patent FR 2 910 875, this bulkhead is substantially planar and extends, on one side, upwards and towards the nose of the fuselage from the front edge of a floor of the pressurized zone and, on the other side, downwards and towards the rear of the fuselage from this front edge of the floor, under the latter. In such an arrangement, the unpressurized housing accommodating the nose landing gear is delimited between part of the pressuretight bulkhead, lateral walls of the fuselage and a front panel which separates this housing from an unpressurized nose containing electronic equipment such as a radar. A configuration of this type makes it possible to reduce the mass of the aircraft nose structure by comparison with a conventional configuration.

BRIEF SUMMARY OF THE INVENTION

An aspect of the invention provides an aircraft nose structure of the aforementioned type which, amongst other things, is of a particularly simple design, is easy to manufacture and is of lower mass.

To this end, one embodiment of the invention is an aircraft nose structure comprising a fuselage and a pressuretight bulkhead fixed at its periphery to the fuselage and transversely dividing the fuselage into a pressurized upper zone and an unpressurized lower zone for accommodating retractable nose landing gear, this structure being notable in that the pressuretight bulkhead comprises a floor of the pressurized upper zone, the floor being fixed laterally to the fuselage in a pressuretight manner and suited to forming a pressure barrier. Thus, the floor of the pressurized upper zone forms part of the pressuretight bulkhead, making it possible to lighten the structure of the aircraft nose section by comparison with a configuration in which these two elements are separate. The aircraft nose structure is thereby simplified, and this is advantageous from a nose structure design and assembly standpoint, and therefore, from a cost standpoint.

According to one feature of the invention, the pressuretight bulkhead comprises at least one substantially flat rear panel extending between a rear edge of the floor and the fuselage. This layout, by virtue of which the pressurized zone of the aircraft is separated from the unpressurized compartment accommodating the nose landing gear essentially by two planar panels, also contributes to the simplicity of designing and assembling the nose structure.

According to another feature of the invention, the fuselage comprises an exterior wall and transverse reinforcing frames to which the exterior wall is fixed. In line with the pressuretight bulkhead, the extension of at least some of these transverse reinforcing frames is limited to the pressurized upper zone. The aircraft nose structure is thus lightened because, in line with the floor and the rear panel, the lateral walls of the fuselage which are situated below these two panels, can be fitted with transverse reinforcements that have a lower second moment of area than the structural reinforcement such as the transverse frames of the pressurized zone. This is made possible because these lateral walls of the fuselage do not contribute to reacting the loads transmitted by the landing gear and are not subjected to the stresses of pressurization.

According to one feature of the invention, at least one of the elements comprising the floor and the rear panel has a sandwich structure. Such a sandwich structure has the required mechanical qualities for withstanding the pressurization loadings and, in the case of the floor, compressive loadings. It is lightweight and requires no structural reinforcements.

According to another feature of the invention, the transverse reinforcing frames positioned in line with the sandwich structure element each comprise at least one arch extending along the fuselage and fixed at its ends to the element. This fixing of the end of the arches to the sandwich structure makes it possible to spread the loads applied to this structure.

According to another feature of the invention, the sandwich structure panel comprises an element made of a honeycomb material positioned between two walls. Such a sandwich structure panel amongst other things combines the objectives of lightness of weight, good resistance to pressure loadings and, in the case of the floor, good crushing strength in its function as an area on which people walk.

According to another feature of the invention, the lateral panels comprise lateral flanges and the walls of the sandwich structure element have a rim for attachment against one of the lateral flanges.

According to another feature of the invention, the lateral panels comprise lateral flanges and the sandwich structure panel comprises inserts suited to accepting means of attachment to the lateral flanges.

These two methods of fixing a sandwich structure element to a lateral panel for mounting the landing gear are of a particularly simple design, are easy to implement at the time of assembly, and give the structure good rigidity.

According to another feature of the invention, at least one of the elements comprising the floor and the rear panel has a monolithic structure. Such a monolithic structure is slender, and therefore occupies relatively little space, and lightweight.

According to another feature of the invention, the transverse reinforcing frames positioned in line with the monolithic structure element each comprise at least one arch extending along the fuselage and a transverse bar extending between the ends of the arch and to which the element is fixed. This layout makes it possible to strengthen the monolithic structure element so that it can be given the desired mechanical properties.

According to another feature of the invention, the unpressurized lower zone comprises, under the floor, two lateral panels for mounting the said landing gear which are fixed to the floor. Although subjected to loadings from the landing gear, these lateral panels can be fixed to the floor because these loadings are reacted at least in part by transverse reinforcing frames, and, therefore, by the fuselage.

According to another possible feature of the invention, the structure comprises a crossmember for reinforcing the lateral panels and which is positioned under the floor and secured to the fuselage. This crossmember makes it possible to react and to transmit to the fuselage a significant proportion of the loadings applied to the shafts about which the landing gear struts are articulated to the lateral panels, thus minimizing the loadings transmitted via the floor.

According to yet another feature of the invention, the aircraft nose structure comprises a protective panel positioned, between the lateral panels in the unpressurized lower zone, at least against the floor. A monolithic panel such as this, while being relatively slender and lightweight, affords effective protection to the underside of the floor and the rear panel against impact that may result respectively from the bursting of a tire and impact with a flying object.

Another embodiment of the invention is an aircraft provided with a nose structure comprising one or more of the abovementioned features considered alone or in combination. The nose structure according to an embodiment of the invention is particularly well suited to aircraft of the single-aisle type.

BRIEF DESCRIPTION OF THE DRAWINGS

Other features and advantages of the invention will emerge from the following description of one embodiment given solely by way of example and illustrated by the attached drawings in which:

FIG. 3 is a partial view, in cross section on 3-3 of FIG. 1, of the aircraft nose section structure according to the invention;

FIGS. 4 and 5 are detailed views in partial section illustrating two embodiments of how to fix landing gear bay lateral panels to the floor of the structure of FIGS. 1 to 3.

DETAILED DESCRIPTION

Figure 1:
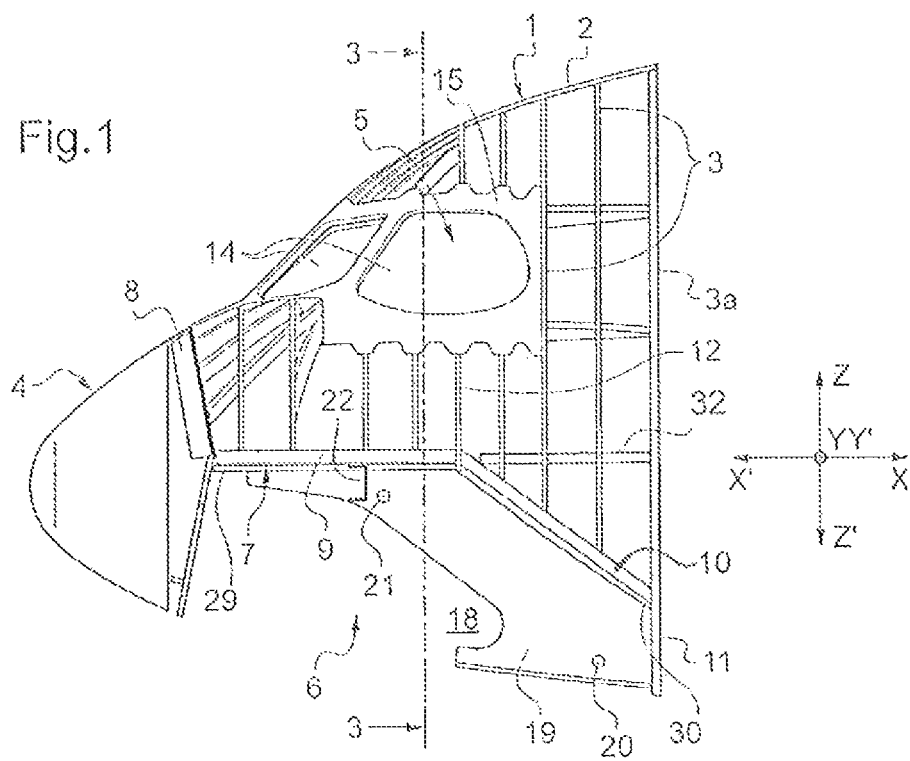
FIG. 1 is a partial view in side elevation, with partial cutaway, of an aircraft nose section having a structure according to the invention.
Figure 2:
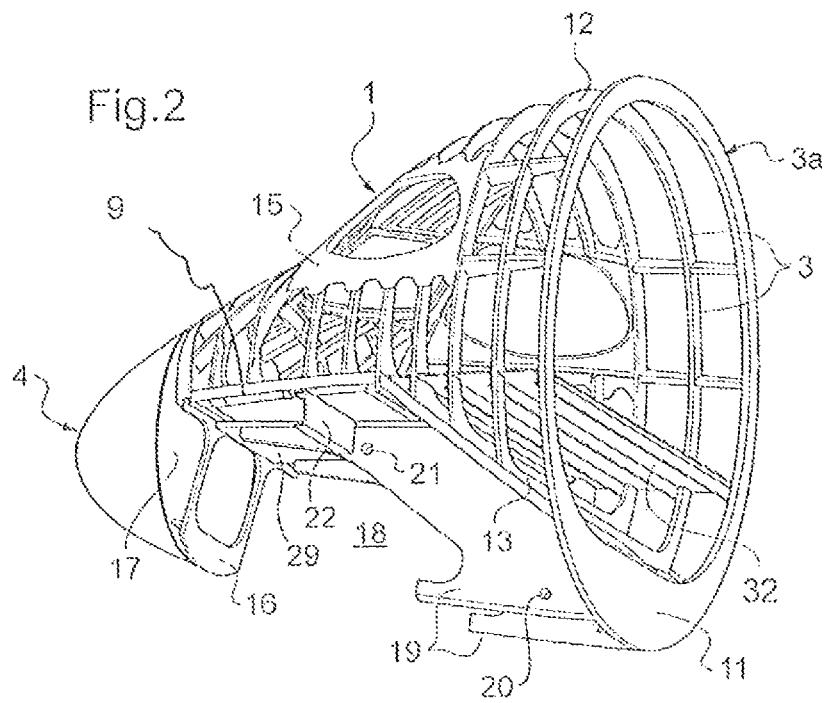
FIG. 2 is a perspective partial view, with partial cutaway, of the aircraft nose section structure of FIG. 1.

With reference to FIGS. 1 to 3, an aircraft nose structure comprising a fuselage nose section 1 will be described with reference to a frame of reference of orthogonal axes X, Y, Z, in which the axis XX' is a longitudinal median axis of the aircraft fuselage, the axis YY' is an axis perpendicular to the axis XX' and passing through the wing tips (not depicted) of the aircraft, and the axis ZZ' is perpendicular to the axes XX' and YY'. In the description that follows, the notions of front, rear, top, bottom, etc. are given with reference to this orthogonal frame of reference, assuming the XY plane to be horizontal.

The fuselage nose section 1 comprises an exterior wall or skin 2 fixed to transverse reinforcing frames 3 of the fuselage which are substantially parallel to one another and perpendicular to the XZ plane.

The fuselage nose section 1 comprises, at its front end, a nose 4 containing electronic equipment (not depicted) such as a radar for example.

The fuselage nose section 1 is split transversely into two zones, a pressurized upper zone 5 and an unpressurized lower zone 6. The pressurized upper zone 5 and unpressurized lower zone 6 are separated from one another by a transverse bulkhead 7 that forms a pressuretight barrier.

The pressuretight transverse bulkhead 7 comprises, from the front of the aircraft backwards along the axis XX', a front panel 8, a sandwich structure floor 9 and a monolithic structure rear panel 10. The two panels 8 and 10 and the floor 9 extend, along the axis YY', across the entire width of the fuselage nose section 1 to which they are fixed laterally and in a pressuretight manner. These three elements are contiguous and together form a pressure barrier across the entire width of the fuselage.

The floor 9 is parallel to the XY plane, which means to say that it is horizontal when the aircraft is on the ground. The front panel 8 is preferably planar but, as an alternative, could be spherical with a large radius of curvature, and extends upwards and towards the front of the fuselage from the front edge of the floor 9. The rear panel 10 is preferably planar but, as an alternative, could be of spherical shape with a large radius of curvature, and extends, parallel to the axis YY', downwards and towards the rear of the fuselage from the rear edge of the floor 9 as far as a frame 3a. The frame 3a is, out of the frames 3 of the structure illustrated in the drawings, the one situated furthest towards the rear along the axis XX'.

The rear fuselage frame 3a comprises, towards the bottom, a solid web 11 which completes the pressuretight bulkhead 7 between the rear edge of the rear panel 10 and the fuselage. This fuselage frame 3a extends along the transverse outline of the fuselage nose section 1.

The other transverse frames 3 positioned forward of the rear frame 3a and in line with the pressuretight bulkhead 7 extend at least partially along the outline of the cross section of the pressurized upper zone 5. These transverse frames 3 each comprise at least one arch 12 extending along the portion of the fuselage 1 which constitutes a wall of the pressurized upper zone 5.

The arches 12 of the frames 3 positioned in line with the sandwich structure floor 9 have, at each of their two ends, a frame foot 12a protruding out on the top of the floor 9 in the vicinity of one of its edges adjacent to the fuselage 1. In a known way, the frame feet 12a allow the floor 9 to be fixed to the frames 3 and increase the area of contact between the frames 3 and the floor 9 for spreading load.

The frames 3 positioned in line with the monolithic structure rear panel 10 also each comprise a transverse bar 13 parallel to the axis YY' and extending between the two ends of the arch 12. The bars 13 have a T-shaped or C-shaped cross section so that they can be fixed by conventional means to the rear panel 10. The bars 13 form reinforcing members for the monolithic structure rear panel 10.

As an alternative, the floor 9 and the rear panel may both have a sandwich structure or both have a monolithic structure or, as a further alternative, the floor may have a monolithic structure and the rear panel a sandwich structure.

In any event:

the frames 3 positioned in line with a sandwich structure element have frame feet 12a or similar means of fixing to this element and preferably have no bars 13 in so far as the sandwich structure does not need to be reinforced;

the frames 3 positioned in line with a monolithic structure element have reinforcing bars 13 to which this element is fixed.

At the locations in the fuselage nose section 1 in which the arches 12 are interrupted for windows 14 (e.g.: cockpit glass) and are split into several sections, these arch sections are fixed to a window frame 15 (FIGS. 1 and 2).

The unpressurized lower zone 6 is divided by a frame 16 into a front first compartment 17 intended to house electronic equipment such as radar or the like and a rear second compartment 18 which constitutes a housing for nose landing gear (not depicted) of the aircraft.

The unpressurized front compartment 17 is delimited by the wall of the nose 4, the pressuretight front panel 8 and the frame 16. The frame 16 bears a blanking panel (not depicted in the drawings) used for separating the rear compartment 18 from the front compartment 17. This blanking panel preferably has a hatch (not depicted) which, when the aircraft is on the ground with the landing gear down, allows the front compartment 17 to be accessed. This blanking panel also protects the electronic equipment of the front compartment 17 from anything thrown up by the landing gear.

The rear compartment 18 housing the nose landing gear is delimited at the front by the frame 16 and the aforementioned blanking panel, at the top by the floor 9, at the rear by the rear panel 10 and the web 11, and laterally by fuselage panels 2d and 2g (FIGS. 2 and 3).

The rear compartment 18 housing the nose landing gear is internally equipped, under the floor 9 and under the rear panel 10, with first and second lateral flanks 19 which are substantially parallel to a median plane XZ of the fuselage and positioned on either side of this median plane XZ. The flanks 19 are suited to carrying two pairs 20 and 21 of aligned bearings.

The lateral fuselage panels 2d and 2g of the rear compartment 18 are fixed at their lower part to a frame 26 which delimits an opening 27 of substantially the same width as the separation between the lateral flanks 19. This opening 27 allows the nose landing gear to enter and exit the rear compartment 18.

The rear bearings 20, positioned near the rear frame 3a, are intended to carry the shafts about which the landing gear (not depicted) support legs (not depicted) are articulated.

The bearings 21, positioned in alignment with the floor 9, are intended to carry shafts about which struts (not depicted) that control the lowering and retraction of the landing gear from and into the compartment 18 are articulated.

Inside the rear compartment 18, the volume in which the nose landing gear is housed when retracted and which represents the nose landing gear bay 28 proper, is delimited more or less between the frame 16 equipped with its blanking panel, the floor 9 and the rear panel 10 that forms the roof of the bay, the web 11 and, substantially in alignment with the lateral edges of the opening 27, the planes (which are parallel to the XZ plane) of the interior faces of the flanks 19.

When viewed in side elevation, the lateral flanks 19 have an overall C-shape and, in the aforementioned plane parallel to the XZ plane, only very partially occupy the longitudinal cross section of the compartment 18, namely the top and rear portions thereof. In other words, the bay 28 is fairly unobstructed over the remainder of the volume of the rear compartment 18 contained between the sides of the bay 28 and the lateral walls 2d and 2g. These lateral flanks 19 afford a significant weight saving by comparison with the solid lateral panels used in conventional nose landing gear bays.

In the unpressurized lower zone 6, a protective panel 29 is fitted against the underside of the floor 9, in the central part thereof contained between the lateral flanks 19, to protect the underside of the floor 9 from impacts that may result, for example, from the bursting of a tire. For preference, the protective panel 29 is made of a monolithic material which offers the advantage of being relatively slender and lightweight.

The protective panel 29 is advantageously extended towards the rear by a protective panel 30 fitted against the underside of the rear panel 10, likewise in the central part thereof contained between the lateral flanks 19. The protective panel 30 is likewise preferably made of a monolithic material and protects the rear panel 10 from impacts due, for example, to impact by a flying object and/or the bursting of a tire.

The lateral flanks 19 are fixed, forward of the bearings 21, to a reinforcing crossmember 22 which extends parallel to the axis YY' across the entire width of the fuselage, under the floor 9, approximately mid-way along the length thereof when considering the axis XX'. The reinforcing crossmember 22, which is fixed in a conventional way at its ends to the fuselage 1, has the purpose of reacting loadings from the landing gear which are applied to the lateral flanks 19 and of transmitting them to the fuselage. The crossmember 22, because it is positioned against and under the floor 9, plays a part in reinforcing this floor.

The lateral flanks 19 are fixed at the top to the floor 9, preferably using one or other of the two ways depicted in FIGS. 4 and 5.

In the way depicted in FIG. 4, the sandwich structure floor 9 is made up of several longitudinal elements 9a positioned between the lateral flanks 19 and on either side of these flanks. Each sandwich structure longitudinal element 9a comprises a web 9b made of a cellular honeycomb-type material held between an upper or first wall 9c and a lower or second wall 9d. The walls 9c and 9d are joined together along the lateral edges of the elements 9a, forming laterally protruding rims 9e.

The lateral flanks 19 each have at the top a T-shaped cross section and the opposing rims 9e of two adjacent elements 9a rest against the flanges 19a that together form the base of the T of a flank 19. The rims 9e are fixed to the flanges 19a using rivets (not depicted).

On the underside of the floor 9, the floor elements 9a are likewise fixed to an adjacent lateral flank 19 using a number of brackets 23 which are fixed, here and there along this flank 19, respectively to the underside of the floor 9 and to the flank 19 using rivets (not depicted).

In the way depicted in FIG. 5, the floor 9 is made up of a single sandwich structure element. The lateral flanks 19 here are made up of hollow panels, either made of metal and machined from solid or of composite material. The flanges 19a of the lateral flanks 19 rest against the underside 9d of the floor 9. The floor 9 comprises, here and there in line with the flanks 19, inserts 24 which have housings 25 suited to accommodating the heads of rivets (not depicted) by means of which the lateral flanks 19 are fixed to the floor 9. As an alternative, one single continuous insert 24 could be provided in line with each lateral flank 19.

In the way depicted in FIG. 4 just as in the way depicted in FIG. 5, the sandwich structure floor 9 is fixed along each of its lateral edges 9f to a bracket 31 which is itself fixed to the fuselage 1 as depicted in FIG. 5. The monolithic structure rear panel 10 is similarly fixed to the fuselage using brackets, not depicted.

From the intersection between the rear panel 10 and the sandwich structure floor 9, the latter is extended rearwards (along the axis XX') in the pressurized upper zone 5, by a floor 32 of conventional structure, which means to say a non-pressuretight floor made up of crossmembers, spars, antishear webs, etc. The sandwich structure floor 9 and the conventional structure floor 32 that extends it on their upper surface support a covering (not depicted) suited to allowing ease of walking. Together they form, above the compartment 18 for housing the nose landing gear, the floor of the aircraft flight deck.

The aircraft nose section structure described hereinabove allows the floor and pressure barrier functions to be combined and is particularly well suited to the case of "single-aisle" aircraft in which the volume of the nose cone is small.

This combination of functions is favoured by a special design of the framework of the fuselage in the nose cone which makes it possible to reduce the mass of this nose cone and therefore improve the performance of the aircraft while at the same time allowing flat panels to withstand the pressurization loadings.

This structure also allows time and cost savings in assembling the nose cone by incorporating components which are simple to produce, large in size, reducing the total number of components that have to be used.

The invention claimed is:

1. An aircraft nose structure comprising:
   a fuselage; and
   a pressuretight bulkhead fixed at a periphery thereof to said fuselage and transversely dividing said fuselage into a pressurized upper zone and an unpressurized lower zone for accommodating retractable nose landing gear,
   wherein said pressuretight bulkhead comprises a floor of said pressurized upper zone, said floor being fixed laterally to said fuselage in a pressuretight manner and configured for forming a pressure barrier, and forming a floor of a flight deck of an aircraft.

2. The aircraft nose structure according to claim 1, wherein said pressuretight bulkhead comprises at least one substantially flat rear panel extending between a rear edge of said floor and said fuselage.

3. The aircraft nose structure according to claim 1, wherein said fuselage comprises an exterior wall and a plurality of transverse reinforcing frames, said exterior wall being fixed to the reinforcing frames, wherein, in line with said pressuretight bulkhead, at least some of said transverse reinforcing frames are limited to said pressurized upper zone.

4. The aircraft nose structure according to claim 1, wherein at least one of said floor and said rear panel comprises a sandwich structure.

5. The aircraft nose structure according to claim 3, wherein at least one of said floor and said rear panel comprises a sandwich structure; and
   wherein said transverse reinforcing frames positioned in line with said sandwich structure element each comprise at least one arch extending along said fuselage and fixed at the ends thereof to said element.

6. The aircraft nose structure according to claim 4, wherein said sandwich structure panel comprises an element made of a honeycomb material positioned between first and second walls.

7. The aircraft nose structure according to claim 6, further comprising lateral flanks comprising lateral flanges and said first and second walls of said sandwich structure element comprise a rim for attachment against one of said lateral flanges.

8. The aircraft nose structure according to claim 6, wherein said lateral flanks comprise lateral flanges and said sandwich structure panel comprises a plurality of inserts configured for accepting means of attachment to said lateral flanges.

9. The aircraft nose structure according to claim 1, wherein at least one of said floor and said rear panel comprises a monolithic structure.

10. The aircraft nose structure according to claim 3, wherein at least one of said floor and said rear panel comprises a monolithic positioned in line with said monolithic structure element each comprise at least one arch extending along said fuselage and a transverse bar extending between the ends of said arch and to which said element is fixed.

11. The aircraft nose structure according to claim 1, wherein said unpressurized lower zone comprises, under said floor, first and second lateral flanks for mounting said landing gear fixed to said floor.

12. The aircraft nose structure according to claim 11, further comprising a crossmember for reinforcing said lateral flanks and positioned under said floor and secured to said fuselage.

13. The aircraft nose structure according to claim 11, further comprising a protective panel positioned, between said lateral flanks in said unpressurized lower zone, at least against said floor.

14. The aircraft nose structure according to claim 13, wherein said protective panel is made of a monolithic material.

15. An aircraft comprising a nose structure, the nose structure comprising:
    a fuselage; and
    a pressuretight bulkhead fixed at a periphery thereof to said fuselage and transversely dividing said fuselage into a pressurized upper zone and an unpressurized lower zone for accommodating retractable nose landing gear,
    wherein said pressuretight bulkhead comprises a floor of said pressurized upper zone, said floor being fixed laterally to said fuselage in a pressuretight manner and configured for forming a pressure barrier, and forming a floor of a flight deck of an aircraft.

* * * * *

UNITED STATES PATENT AND TRADEMARK OFFICE
CERTIFICATE OF CORRECTION

PATENT NO. : 8,905,352 B2
APPLICATION NO. : 13/710577
DATED : December 9, 2014
INVENTOR(S) : Philippe Bernadet et al.

Page 1 of 1

It is certified that error appears in the above-identified patent and that said Letters Patent is hereby corrected as shown below:

In the Claims

Column 8, line 16, after "monolithic" insert --structure; and wherein said transverse reinforcing frames--.

Signed and Sealed this
Fifth Day of January, 2016

Michelle K. Lee
*Director of the United States Patent and Trademark Office*